United States Patent [19]

Hostetler

[11] Patent Number: 5,105,770
[45] Date of Patent: * Apr. 21, 1992

[54] DRINKER SHIELD

[75] Inventor: Eldon Hostetler, Middlebury, Ind.

[73] Assignee: Ziggity Systems, Inc., Middlebury, Ind.

[*] Notice: The portion of the term of this patent subsequent to Apr. 23, 2008 has been disclaimed.

[21] Appl. No.: 625,880

[22] Filed: Dec. 11, 1990

Related U.S. Application Data

[63] Continuation of Ser. No. 469,735, Jan. 19, 1990, Pat. No. 5,009,194.

[51] Int. Cl.⁵ .............................................. A01K 7/00
[52] U.S. Cl. ...................................... 119/72; 119/72.5
[58] Field of Search ............... 119/72, 72.5, 74, 75; 137/377, 382

[56] References Cited

U.S. PATENT DOCUMENTS

| | | | |
|---|---|---|---|
| 2,086,303 | 7/1937 | Scholander | 119/72 |
| 2,128,050 | 8/1938 | Landis | 137/377 |
| 2,530,911 | 11/1950 | Schultz | 119/72 |
| 3,385,267 | 5/1968 | Boegli et al. | 119/72.5 |
| 3,466,007 | 9/1969 | Launder | 119/72.5 |
| 3,483,847 | 12/1969 | Kneubuehl | 119/75 |
| 3,527,193 | 9/1970 | Smith | 119/72.5 |
| 3,550,560 | 12/1970 | Edstrom | 119/72.5 |
| 3,716,030 | 2/1973 | Godshalk et al. | 119/72.5 |
| 3,958,535 | 5/1976 | Salvia | 119/72.5 |
| 4,036,438 | 7/1977 | Soderlind et al. | 239/288.5 |
| 4,373,471 | 2/1983 | Coulbourn | 119/72 |
| 5,009,194 | 4/1991 | Hostetler | 119/72.5 X |

Primary Examiner—Gene Mancene
Assistant Examiner—Thomas Price
Attorney, Agent, or Firm—Barnes & Thornburg

[57] ABSTRACT

A watering device for fowl and small animals utilizing a trigger drinker with a shield surrounding the trigger pin. The shield is conically shaped with a bottom portion having a greater diameter than the top portion. The bottom of the shield is slightly below the bottom of the trigger pin to prevent incidental bumping by poultry and other animals. A plurality of struts connecting the bottom circular section to the circular drinker housing on top form the sides of the conical shaped shield. The sides are substantially open to allow chickens to view the trigger pin from all directions. The novel device prevents inadvertent bumping, and trains birds to activate a trigger drinker from below the trigger pin while allowing visibility of the trigger pin from substantially all directions.

20 Claims, 1 Drawing Sheet

DRINKER SHIELD

This application is a continuation of application Ser. No. 07/469,735, filed Jan. 19, 1990 now U.S. Pat. No. 5,009,194.

BACKGROUND AND SUMMARY OF THE INVENTION

The present invention relates generally to watering systems for poultry and/or small animals and, more particularly, to watering systems employing trigger drinkers.

Various trigger drinkers are presently known. One preferred type is described in detail in U.S. Pat. No. 4,589,373 now U.S. Pat. No. 5,000,194, assigned to the same assignee as the present invention. The disclosure of that reference is specifically incorporated herein. In general, trigger drinkers can be mounted directly into a fluid supply line. In a typical system, a plurality of horizontal supply lines are adjustably suspended from the ceiling of a poultry house at heights determined by the size of the birds therein. Each supply line can extend for over 50 meters in length and includes a large number of spaced-apart trigger drinkers. This invention is also useful in cage-bank houses.

Trigger drinkers can be activated by not only pushing the trigger pin directly into the trigger drinker, but also by pushing sideways on the trigger pin. This allows birds to easily obtain water from the trigger drinker. Recently, chicken producers have utilized cages having decreased cage heights in cage bank systems. This decreased cage height, coupled with the ease of operation of the trigger drinker, required a means to prevent chickens from inadvertently bumping the trigger drinker. By providing a shielding arrangement surrounding the trigger pin, chickens are taught to activate the trigger drinker by pushing directly upward on the nipple.

Trigger drinkers have achieved wide spread acceptance as being suitable for watering poultry of all ages. However, as the chicks grow, the location of the trigger drinker must be constantly moved upward to prevent the poultry from inadvertently bumping the trigger drinker and discharging water into the chicken's environment. However, chickens vary in size and in order for the smaller chickens to activate the trigger, the device must be lower than needed for larger chickens. These larger birds can inadvertently bump unguarded trigger drinkers.

Additionally, poultry learn to bump the trigger drinkers to get cool in hot weather. This is beneficial to cool the birds, however spillage of water can cause odor, disease, infection, and sanitation problems.

In general, it is important to optimize the watering system in a given poultry house by reducing the number of different apparatus that must be used as the poultry grow, minimizing assembly maintenance and repair time, and eliminating leaks and spillage onto the floor area. Since trigger drinkers have otherwise been the preferred watering device for poultry and small animals, it is desirable to obtain a drinker shield arrangement complimentary or compatible with trigger drinkers which would prevent accidental activation.

It is therefore an object of the present invention to provide an improved watering device for poultry and small animals.

Another object is the provision of a shield means which is lightweight, inexpensive, and easy to attach to a trigger drinker watering unit to prevent accidental activation of the trigger drinker.

A further object is to provide a means to teach chickens and other small animals to activate a trigger pin from below the trigger pin.

A further object is to teach chickens and small animals to use better drinking position thereby eliminating spillage of water.

A further object is to provide a means so that chickens obtain more water in each peck.

Yet another object is to provide a shield that is open to the view of chickens and other small animals so that the glistening of water and/or the pin can be seen from the side of the trigger drinker.

Yet still another object is the provision of a drinker unit which helps to eliminate boss birds from controlling the water supply by allowing the drinker to be placed distant from the feeder.

These and other objects of the present invention are obtained in the provision of a shield to protect a trigger drinker from incidental bumping by poultry and other animals. The shield is constructed to allow birds to drink from below the watering nipple, yet prevent inadvertent activation by non-drinking contact.

A preferred embodiment of the shield is conical in shape with a bottom portion having a greater diameter than the top portion. The bottom of the shield is slightly below the bottom of the trigger pin or nipple. A plurality of struts connecting the bottom circular section to the circular drinker housing on top form the sides of the conical shaped shield.

Other objects, advantages, and novel features of the present invention will be readily apparent upon consideration of the following detailed description in conjunction with the drawings.

DESCRIPTION OF THE PREFERRED EMBODIMENTS

Figure 1:
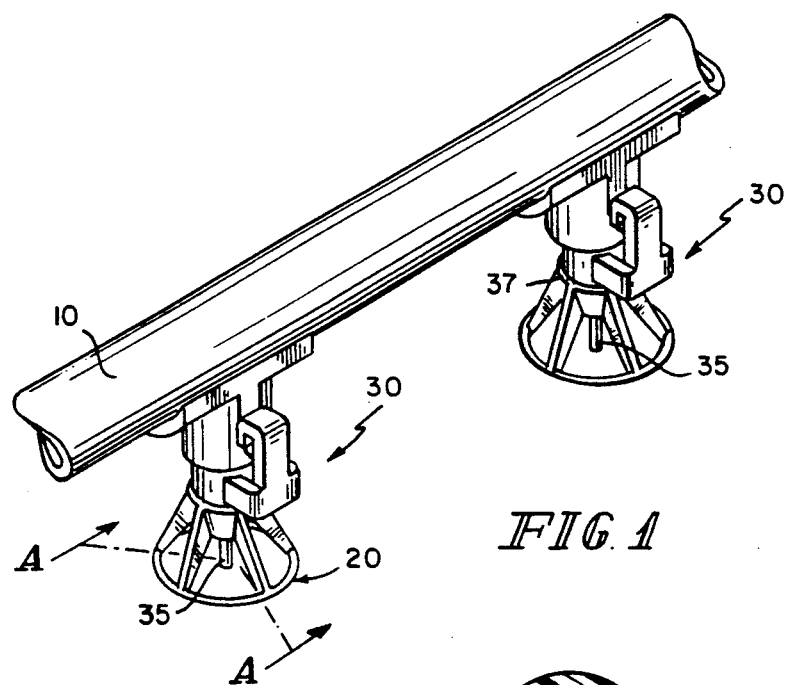
FIG. 1 is a pictorial view of two trigger drinker units attached to a water supply line.

FIG. 1, which illustrates a preferred embodiment of the present invention, shows a watering system having a fluid supply line 10 for transporting water or medicated fluid from a conventional source (not shown) and two trigger drinker units 30 connected thereto. Trigger drinker unit 30 includes a shield 20 comprising a smaller top circular portion 40 and a larger bottom circular portion 50, connected by struts 60 to form a truncated, generally conical shape. This partially open shield extends radially outward from the base portion of the drinker unit. In the preferred embodiment, drinker shield 20 is ultrasonically welded to trigger drinker unit 30. Drinker shield 20 could be integrally formed as part of trigger drinker unit 30, or connected by several other connection means.

Figure 2:
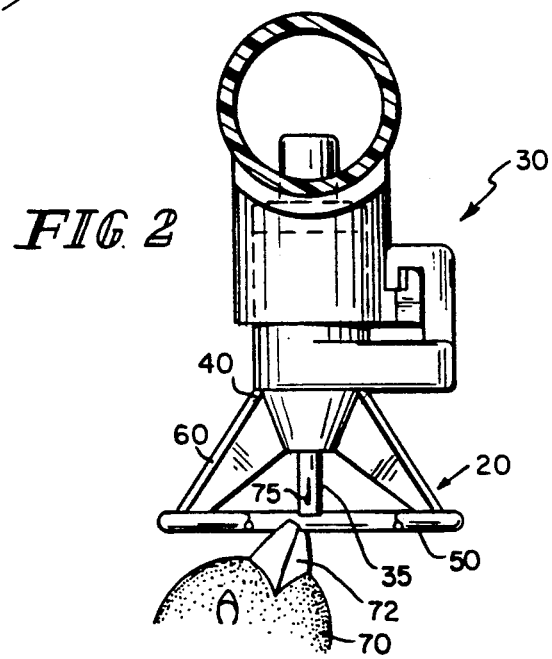
FIG. 2 is a partial cross-sectional view along AA of FIG. 1.

In FIG. 2, chicken 70 having beak 72 is seen in a position to push on trigger pin 35. Debeaked chickens are sensitive to touch, particularly directly after debeaking and a easy operating drinker is essential for the sensitive birds. Chicken 70 is illustrated in a proper drinking position. Chicken 70 uses beak 72 to push substantially upward on trigger pin 35 allowing drops of water to flow directly into beak 72. This allows birds to get more water from each peck, which is particularly important during the period when the debeaked birds are sensitive to the touch.

As seen in FIG. 2, bottom portion 50 of the shield 20 extends slightly below trigger pin 35. By extending the bottom portion 50 slightly below the trigger pin 35, chickens are prevented from inadvertently bumping or knocking on the trigger pin 35.

Another distinctive feature of the shield is that the struts connecting the top portion 40 to the bottom portion 50 allow a chicken to view the trigger pin from the side as well as the bottom of the trigger drinker unit. As seen in FIG. 2, a droplet of water 75 can remain on trigger pin 35. The chickens can see this glistening droplet of water and are attracted and tend to poke or peck at the glistening droplet.

The openness of the shield also allows air movement through the shield so that the environment near the drinker pin does not become stagnant. This helps to reduce the chance for bacteria and infection to develop on the drinker unit.

Figure 4:
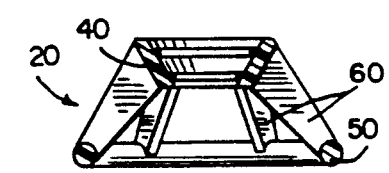
FIG. 4 is a view of pictorial view of the shield prior to attachment to the drinker.

As can be seen from FIG. 4, a preferred embodiment of the present invention has the shield ultrasonically welded to the trigger drinker allowing the shield to be attached to conventional drinker units. As stated earlier other connection means, such as glue or a threaded connection could be utilized to connect the shield to the drinker unit.

This drinker with the novel shield allows the watering system to be positioned in the center of the cage without fear of spraying and dripping. This positioning feature prevents "boss" birds from dominating the drinker because they must continually move between the drinker and feeder trough (not shown) at the front of the cage. Prior drinkers tended to be near the outside edge of the cage to keep water from falling onto birds. On the other hand, the present invention teaches birds to drink from below the shielded drinker so they get more water with fewer drips on the floor. The novel shield helps to minimize these unwanted enemies of the poultry industry.

Figure 3:
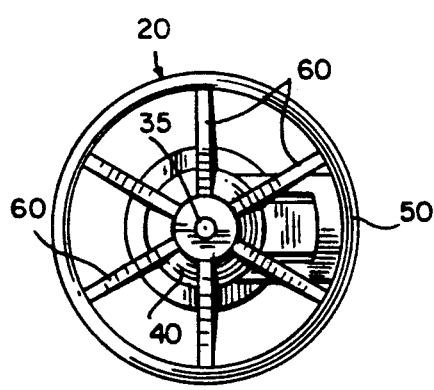
FIG. 3 is a view from the bottom of the trigger drinker unit.

FIG. 3 gives a bottom view of the trigger drinker unit including the integrally formed shield. Specifically, the shield forms a natural circular target for chickens to focus on. The center of the target formed by trigger pin 35 needs to be activated for chickens to obtain the necessary water.

Although the present invention has been described in detail, the same is by way of illustration and example only and is not to be taken by way of limitation. The spirit and scope of the present invention are to be limited only by the terms of the appended claims.

What is claimed is:

1. A shield apparatus attached to a trigger drinker watering unit with a trigger pin and a base portion, comprising:
   a partially open shield surrounding said trigger pin such that said trigger pin is protected from inadvertent lateral activation by an animal;
   said partially open shield surrounding said trigger pin and extending radially outward from said base portion of said trigger drinker watering unit;
   said partially open shield having a top portion and a bottom portion;
   said bottom portion of said partially open shield located below or level wtih a bottom portion of said trigger pin when said trigger pin is in a substantially open position; and
   a connection means for attaching said shield apparatus to said trigger drinker watering unit.

2. The shield apparatus of claim 1 wherein said shield apparatus is conical with said bottom portion having a greater diameter than said top portion.

3. The shield apparatus of claim 2 wherein said bottom portion extends slightly below said trigger pin.

4. The shield apparatus of claim 2 wherein at least two struts connect said top portion to said bottom portion.

5. The shield apparatus of claim 4 wherein at least five struts connect said top portion to said bottom portion without substantially obstructing the animal's view of the trigger pin.

6. The shield apparatus of claim 1 wherein said shield apparatus is ultrasonically welded to said trigger drinker watering unit.

7. The shield apparatus of claim 1 wherein said trigger drinker watering unit is attached to a chicken cage distant from a feeding unit.

8. A training device attached to a trigger drinker watering unit for teaching birds to drink from below said trigger drinker watering unit, comprising:
   a trigger drinker watering unit with a trigger pin and a shield means for surrounding said trigger pin;
   said shield means prevents lateral access to said trigger pin which teaches birds to activate said trigger pin by pushing upward; and
   said shield means is substantially open to allow said birds to view said trigger pin from the side.

9. The training device of claim 8 wherein said shield means includes a bottom portion having a greater diameter than a top portion to provide a larger opening in said bottom portion thereby teaching said birds to activate said pin from below the drinker.

10. The training device of claim 8 wherein said shield means is substantially conical.

11. The training device of claim 10 wherein said shield means is substantially conical with a bottom portion having a greater diameter than a top portion.

12. The training device of claim 10 wherein a plurality of struts connect a top portion to a bottom portion of said shield means.

13. The training device of claim 10 wherein said shield means is integrally formed with said drinker unit.

14. The training device of claim 8 wherein said shield means is integrally formed with said drinker unit.

15. A method of training birds to drink from a trigger drinker watering unit, comprising the steps of:
   exposing a droplet of water glistening on a bottom portion of a drinking pin in view of birds through a partially open shield; and
   said partially open shield extending below or level with a bottom portion of said drinking pin precludes inadvertent lateral activation of said drinking pin.

16. A watering device for poultry and small animals, comprising:
   a trigger drinker portion having a trigger pin projecting therefrom, said trigger pin serving to permit actuation of said trigger drinker portion to provide water to said poultry or said small animals;

a partially open shield portion connected to said trigger drinker portion for preventing inadvertent actuation of said trigger drinker portion; and said partially open shield portion extending around and spaced apart from said trigger pin and extending further than or level wtih the furthest projection of said trigger pin from said trigger drinker portion.

17. The watering device according to claim 16 wherein said trigger pin is generally cylindrical and extends downwardly out of said trigger drinker portion and wherein said shield portion includes a generally conical structure flaring radially outward from said trigger pin along at least a portion of the length of said trigger pin.

18. The watering device according to claim 17 wherein said shield portion is formed and disposed with respect to said trigger pin such that lateral actuation contact with said trigger pin is restricted without restricting actuation contact with said trigger pin by upward movement of said poultry or said small animals into contact with said trigger pin.

19. A watering device for poultry including a trigger drinker means for controlling the flow of water to said poultry, trigger pins means connected to said trigger drinker means to actuate said trigger drinker means to cause water to flow to said poultry, and a partially open shield means connected to said trigger drinker means for preventing actuation of said trigger pin means except by movement of said poultry against said trigger pin in substantially one direction, said partially open shield means being configured so as to permit a length of said trigger pin means to remain substantially visible to said poultry from the side of said partially open shield means.

20. A watering device for poultry, comprising:

a drinker means for controlling fluid flow;

a trigger pin means connected to said drinker means and operably associated with said drinker means such that when said trigger pin is actuated fluid flows to said poultry over the surface of said trigger pin;

said trigger pin being actuated by lateral and longitudinal forces applied thereto; and a shield means connected to said drinker means for limiting actuation of said trigger pin by lateral forces applied thereto;

said shield means including:

a first portion adjacent and connected to said drinker means;

a second portion disposed around and spaced apart from said trigger pin means; and a strut portion connecting said first portion with said second portion while maintaining spaces therebetween such that said trigger pin remains visible to said poultry.

* * * * *

UNITED STATES PATENT AND TRADEMARK OFFICE
CERTIFICATE OF CORRECTION

PATENT NO.    :   5,105,770
DATED         :   April 21, 1992
INVENTOR(S)   :   Eldon Hostetler It is certified that error appears in the above-identified patent and that said Letters Patent is hereby corrected as shown below:

Claim 1, column 4, line 4, please delete "wtih" and insert -- with -- therefor.

Signed and Sealed this

Fifteenth Day of June, 1993

Attest:

MICHAEL K. KIRK

Attesting Officer

Acting Commissioner of Patents and Trademarks